United States Patent

[11] 3,629,064

[72] Inventor Samuel M. Zivi
 Sherman Oaks, Calif.
[21] Appl. No. 758,454
[22] Filed Sept. 9, 1968
[45] Patented Dec. 21, 1971
[73] Assignee TRW Inc.
 Redondo Beach, Calif.

[54] SAFETY APPARATUS FOR NUCLEAR REACTORS
 4 Claims, 2 Drawing Figs.
[52] U.S. Cl. ................................................. 176/38,
 176/87
[51] Int. Cl. ..................................................... G21c 9/00
[50] Field of Search ........................................ 176/37, 38,
 87

[56] References Cited
 UNITED STATES PATENTS
3,238,105 3/1966 McNelly ...................... 176/37
3,357,889 12/1967 Blackburn et al ............. 176/87 X
3,378,452 4/1968 Costes .......................... 176/38 X
3,398,050 8/1968 Yevick et al .................. 176/87 X Primary Examiner—Carl D. Quarforth
Assistant Examiner—Harvey E. Behrend
Attorneys—Daniel T. Anderson, Edwin A. Oser and Jerry A. Dinando ABSTRACT: The method of the present invention consists of placing a layer of dense, high-melting temperature material such as unenriched uranium dioxide ($UO_2$), under a nuclear reactor to support by flotation large masses of molten reactor fuel which might otherwise melt through the floor and the containment shell. The apparatus of the invention is comprised of a dish-shaped layer of unenriched $UO_2$ or similar material which is encased in a steel housing. The diameter of the dish-shaped layer is greater than the diameter of the reactor core and if located external to the reactor pressure vessel, the diameter of the layer is at least as great as that of the vessel.

PATENTED DEC 21 1971  3,629,064

Samuel M. Zivi
INVENTOR

BY  *[signature]*

ATTORNEY

SAFETY APPARATUS FOR NUCLEAR REACTORS

BACKGROUND OF THE INVENTION

This invention pertains to the field of nuclear reactors and, more particularly, to safety devices for use with nuclear reactors.

The accident primarily dealt with in this particular invention is the so-called melt-through-accident. This particular accident may occur in the situation where the reactor loses all its coolant and in which the emergency core cooling system fails to prevent gross melting of the reactor core. Even if the control rods were to be inserted immediately after the loss of coolant, there is sufficient heat generated by the decay of the radioactive fission products that the fuel will melt. If these events were to occur, the molten fuel mass would slump to the bottom of the primary reactor vessel, melt through the vessel, fall to the floor or bottom of the reactor pit, melt through the floor and through the bottom of the containment vessel.

Various defenses against this penetration of the containment by a molten fuel mass have been considered. For example, a water-cooled crucible has been considered for placement beneath the primary vessel of the Indian Point No. 2 Reactor. A problem might occur with this water-cooled crucible if, for some reason, the supply of water were to be cut off.

At present, the standard fuel is uranium dioxide ($UO_2$), which has a melting point of about 2,800° C., and a boiling point of almost 3,300° C. The decay heat diminishes with time, but can be sufficient to keep the fuel molten for times on the order of many hours. It would therefore be highly desirable to have a completely passive barrier which could prevent the molten fuel from penetrating the containment vessel.

SUMMARY OF THE INVENTION

In a preferred embodiment of the invention, a dish-shaped layer of unenriched $UO_2$ or other dense, high-melting-temperature material is encased in a steel housing and is positioned under the reactor core between the reactor core and the floor of the containment vessel. This barrier is most easily envisioned as a device external to and beneath the primary pressure vessel, but it could also be designed as part of the bottom of the pressure vessel, or internal to the pressure vessel.

The $UO_2$ mass from a hypothetical reactor meltdown is expected to be effective in boring through a substrate because its melting temperature is higher than that of most structural materials, and because its large density relative to most substrate materials will allow it to displace the substrate which has become molten. The $UO_2$ barrier proposed here is effective in countering both of the above properties. Although the barrier is slowly melted by the fuel mass, the rate of penetration is low for the following reasons: the molten fuel tends to float on top of the molten layer of the barrier because of the higher temperature and dissolved lighter elements in the fuel. In order for the melting front to advance through the barrier, the heat required to melt the barrier $UO_2$ has to be conducted through the previously melted portions of the barrier. The low conductivity of the barrier $UO_2$ makes this a slow process, in contrast to a dense heat source which displaces the melt and continuously moves into contact with fresh, unmolten substrate material. The large enthalpy change involved in raising room temperature $UO_2$ through melting also makes the melting-through process a slow one. Following through on the sequence of events, if for some reason the molten reactor core falls onto the unenriched slab, it would melt through the upper layer of steel and be supported by the $UO_2$ slab with the molten steel floating on the molten fuel or partially alloyed with it. The molten steel will tend to cool the upper surface of the fuel as the steel is vaporized by the decay heat. Meanwhile, melting of the $UO_2$ slab will proceed slowly. In most cases, only several centimeters of the slab will melt before the fuel has cooled and solidified, assuming that other heat removal means exist for conveying heat out of the upper portions of the containment vessel.

Accordingly, it is an object of the present invention to provide a novel safety method and apparatus for use with a nuclear reactor.

It is a further object of the present invention to provide a method and passive apparatus for preventing molten fuel from piercing the containment vessel of a nuclear reactor.

The aforementioned and other objects of the present invention will become more apparent when taken in conjunction with the following description and drawings, throughout which like characters indicate like parts, and which drawings form a part of this application.

BRIEF DESCRIPTION OF THE PREFERRED EMBODIMENTS

Figure 1:
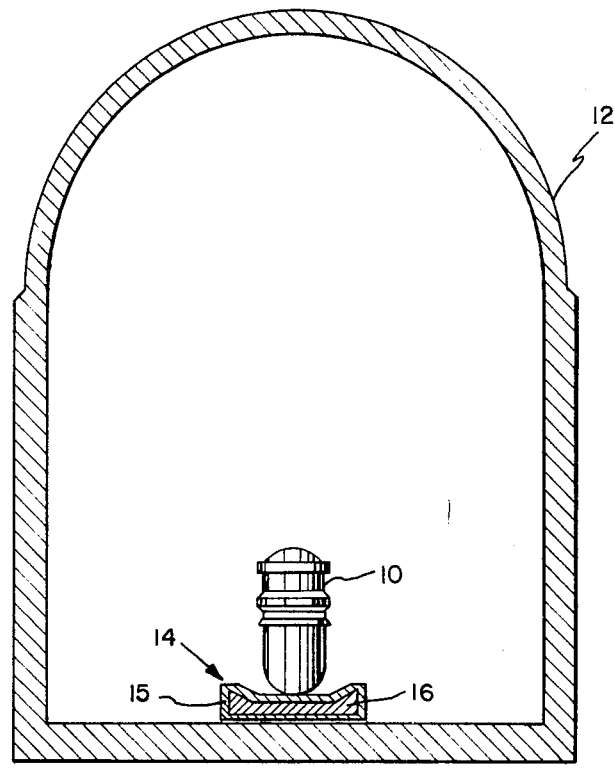
FIG. 1 is a side view, partially sectioned, of a preferred embodiment of the invention.

Referring to FIG. 1, the reactor primary vessel is designated 10. Within the reactor vessel is contained the reactor fuel, not shown, which in most cases is enriched $UO_2$. The safety device 14 is shown comprised of a dish-shaped slab of unenriched $UO_2$ 16 which is encased in a steel housing 15. The safety device 14 is positioned under the reactor primary vessel 10 between the vessel and the containment shell 12 for the reactor.

In this particular embodiment, the slab is comprised of unenriched $UO_2$. The requirement, in order to provide a safety device, is that the density of the material used in the safety device be at least as great as the density of the material used as the fuel when they are at the same temperature. If an accident were to occur and the reactor fuel could not be cooled, then the molten reactor fuel will melt the reactor primary vessel 10 and fall onto the safety device 14. Within a short period of time, the upper layer of the steel dish-shaped jacket 15 will be melted and the fuel will come into contact with the slab 16. The juncture of the molten material with unmolten material, hereinafter will be called the melting front.

In the approximation that the barrier is a semi-infinite slab initially at uniform temperature $T_o$, equation (1) below gives the position of the melting front as a result of imposing a temperature T at the slab surface. This was obtained from Carslaw and Jaeger in *Conduction of Heat in Solids* (Oxford at the Clarendon Press, 1st Ed., p. 21) by assuming that the thermal properties of the slab are not changed by melting.

$$X = m\sqrt{t} \quad (1)$$

where X is the displacement of the melting front
$t$ is the time after imposing a surface temperature $T_s$, and
where $m$ is given implicitly by:

$$\frac{T_s - T_m}{\text{erf } Z} - \frac{T_m - T_o}{1 - \text{erf } Z} = \frac{\lambda \rho m}{2} \frac{\sqrt{\pi a}}{k} e^{Z^2} \quad (2)$$

where $T_m$ is the melting temperature of the slab (2,800° C.),
$\alpha$ is the thermal diffusivity of the slab, $$(5.3 \times 10^{-3} \text{cm.}^2/\text{sec.})$$

$Z = m/2 \sqrt{\alpha}$,
$\lambda$ is the latent heat of fusion (60cal./gm.),
$\rho$ is the density (9.4 gm./cm.³),
$k$ is the thermal conductivity, $$(5 \times 10^{-3} \text{cal./cm.° C. sec.}), \text{ and}$$

$$\text{erf } Z = \sqrt[2]{\pi} \int_0^Z e^{-y^2} dy$$

With assumed numerical values as given parenthetically in the above notation, and with $T_o = 20°$ C. and $T_s = 3,300°$ C., equation (2) yields $$m = 0.02 \text{ cm. sec.}^{-1/2} \quad (3)$$

The assigned value of $T_t=3,300°$ C. is an estimate of the boiling point of $UO_2$, and hence is about the maximum temperature that might be imposed by a molten mass of fuel. With the value of $m=0.02$ cm. sec.$^{-1/2}$, equation (1) indicates that about 12 days would be required for the melting front to advance 20 cm. The latent heat of fusion of $UO_2$ is small enough that the heat conduction process in the slab is not much different that if melting did not occur. Therefore, a good approximation to equations (1) and (2) would be the solution of the conventional transient heat conduction equation to determine the rate of advance of the 2,800° C. temperature front.

If, instead of floating on top of the melted portion of the barrier, the fuel mass were to sink and penetrate the substrate slab, the rate of penetration is given by the following approximate one-dimensional analysis. For simplicity, it is assumed here that the rate of penetration is rapid enough that heat conducted into the substrate ahead of the melting front is unimportant. An energy balance at the melting front is then:

$$U\rho[c(T_m-T_o)+\lambda]=Q \quad (4)$$

where $U$ is the rate of advance of the melting front, $Q$ is the heat flux from the fuel mass into the substrate slab, and $c$ is the substrate specific heat.

The heat flux $Q$ is determined by the decay heat source strength $q$ in the fuel mass and the thickness of fuel from which the decay heat is conducted downward. Assume a uniformly distributed and constant heat source strength $q$, and let the temperature be the melting point, $T_m$, at the interface between the fuel mass and the substrate. Let the temperature be $T_s$ at the plane of maximum temperature in the fuel mass (the separatrix between upward and downward heat flow). Then elementary steady-state heat conduction analysis yields:

$$Q = 2q k(Tl_s-T_m). \quad (5)$$

To illustrate the importance of using a barrier or substrate material which is denser than the molten fuel, the rate of melting advance U is evaluated by means of equations (4) and (5) for the same temperature and thermal properties assumed above. Hence, the substrate has the same properties as in the first case, except that is now assumed that the freshly melted substrate is removed rather than remaining in place. Assuming a value of $q=1$ cal./cm.$^3$ sec., we obtain a penetration velocity of $0.7 \times 10^{-3}$ cm./sec. Then the time required to melt through 20 cm. of substrate would be about $3 \times 40^4$ seconds, or about 8 hours, as compared with 12 days when the fuel mass floats. Hence, the advantage of having a substrate density greater than the molten fuel density is significant.

Figure 2:
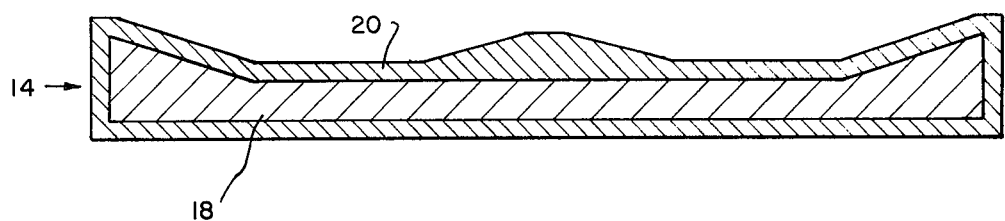
FIG. 2 is a sectional view, on enlarged scale of a second embodiment of the invention.

Referring now to FIG. 2, the safety device 14 is shown comprised of a relatively flat slab of unenriched $UO_2$ material 18 which is encased in a steel jacket 20 formed in the shape of a cusp. The cusp shape distributes the molten fuel over the slab in a more uniform manner.

While there has been shown what is considered to be the preferred embodiment of the present invention utilizing unenriched $UO_2$ as the safety slab device, it will be manifest that many changes and modifications may be made in the material of the slab without departing from the essential spirit of the invention. It is only necessary that the density of the material used in the safety device be greater than the density of the molten fuel and have a melting point not materially lower than that of the fuel. It is intended, therefore, in the annexed claims, to cover all such changes and modifications as may fall within the true scope of the invention.

What is claimed is:

1. A safety apparatus for a nuclear reactor of the type having a containment shell, a reactor vessel contained in said shell, and a nuclear fuel in said reactor vessel, said safety apparatus being capable of retaining the nuclear fuel when melted, said safety apparatus comprising:

a. a substantially dish-shaped slab of unenriched uranium dioxide having a density no less than that of said nuclear fuel and having a melting temperature on the order of that of said nuclear fuel, said slab extending beyond, and being substantially concentric with said reactor vessel and being positioned between said reactor vessel and said containment shell, and having a size sufficient to contain the melted nuclear fuel and having a thickness sufficient to prevent the melted nuclear fuel from melting through said slab.

2. Apparatus as defined in claim 1 wherein a steel jacket is provided for enclosing said slab.

3. Apparatus as defined in claim 1 wherein said nuclear fuel consists of enriched uranium dioxide.

4. The method of containing molten reactor fuel which may escape from a nuclear reactor vessel which comprises the step of positioning a substantially dish-shaped slab of unenriched uranium dioxide having a melting temperature on the order of that of said reactor fuel and having a density greater than that of the molten fuel and having a relatively low thermal conductivity below the molten fuel for collecting and retaining the same, said slab having a size so as to extend beyond the reactor vessel, and being disposed substantially concentric with said reactor vessel and having a size sufficient to contain the molten fuel and having a thickness sufficient to prevent the molten fuel from melting through said slab.

* * * * *

UNITED STATES PATENT OFFICE
CERTIFICATE OF CORRECTION

Patent No. 3,629,064    Dated December 21, 1971

Inventor(s) Samuel M. Zivi

It is certified that error appears in the above-identified patent and that said Letters Patent are hereby corrected as shown below:

In the Specification

Column 2, line 51 "$X = m\ t$" should be --$X = m\sqrt{t}$--.

line 64 "$Z = m/2\ \sqrt{x}$" should be --$Z = m/2\ \sqrt{\alpha}$--.

Column 3, line 37 "$Q = 2\ q\ k(T_s - T_m)$" should be --$Q = \sqrt{2qk(T_s - T_m)}$--.

line 48 "$3 \times 40^4$" should be --$3 \times 10^4$--.

Signed and sealed this 6th day of June 1972.

(SEAL)
Attest:

EDWARD M. FLETCHER, JR.
Attesting Officer

ROBERT GOTTSCHALK
Commissioner of Patents